March 11, 1958     F. A. REUSTLE     2,826,170
CHICKEN BROODING AND RAISING APPARATUS
Filed Aug. 1, 1955     3 Sheets-Sheet 1
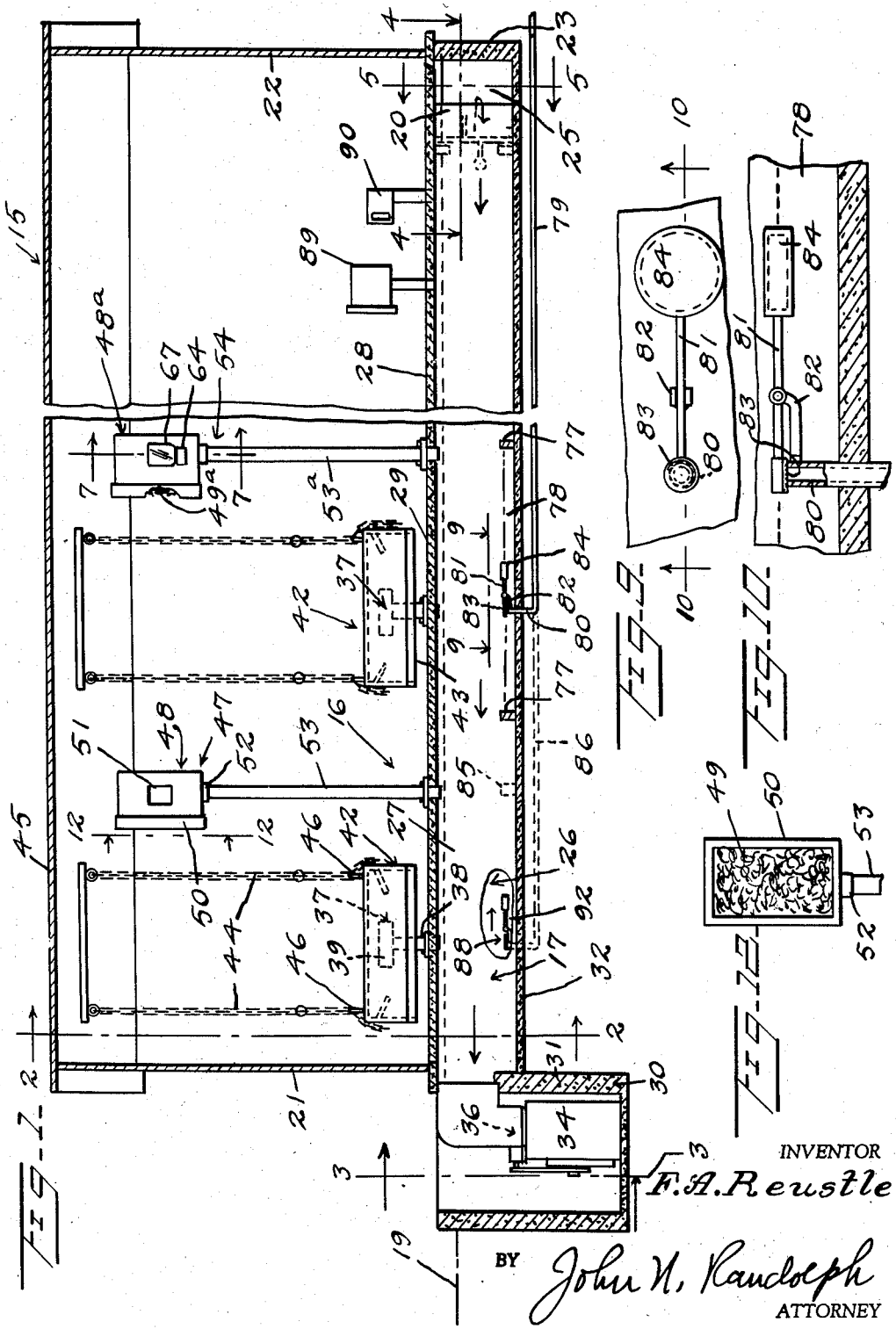
INVENTOR
F. A. Reustle
BY John N. Randolph
ATTORNEY March 11, 1958 F. A. REUSTLE 2,826,170
CHICKEN BROODING AND RAISING APPARATUS
Filed Aug. 1, 1955 3 Sheets-Sheet 2
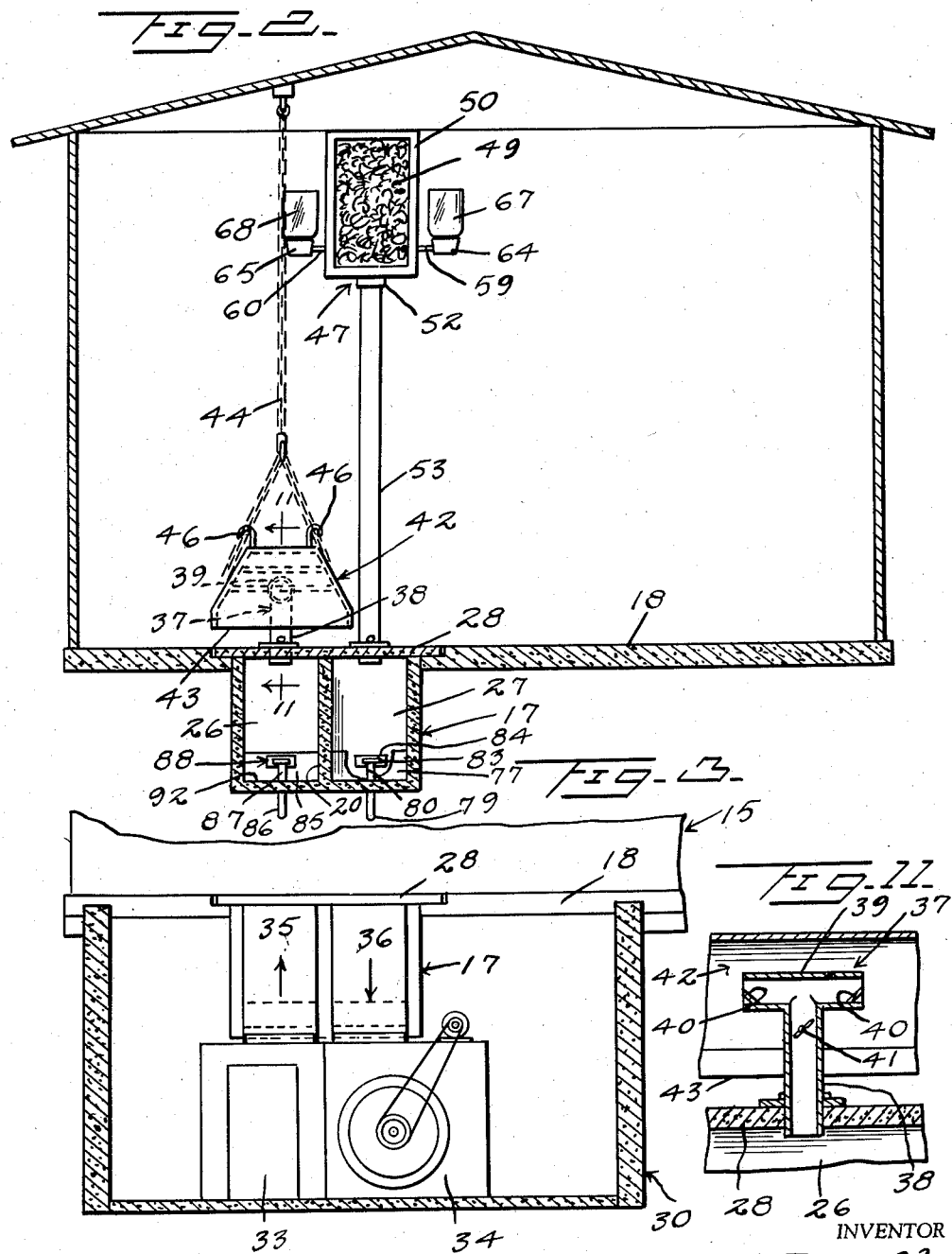
INVENTOR
F.A. Reustle
BY John N. Randolph
ATTORNEY March 11, 1958     F. A. REUSTLE     2,826,170
CHICKEN BROODING AND RAISING APPARATUS
Filed Aug. 1, 1955     3 Sheets-Sheet 3
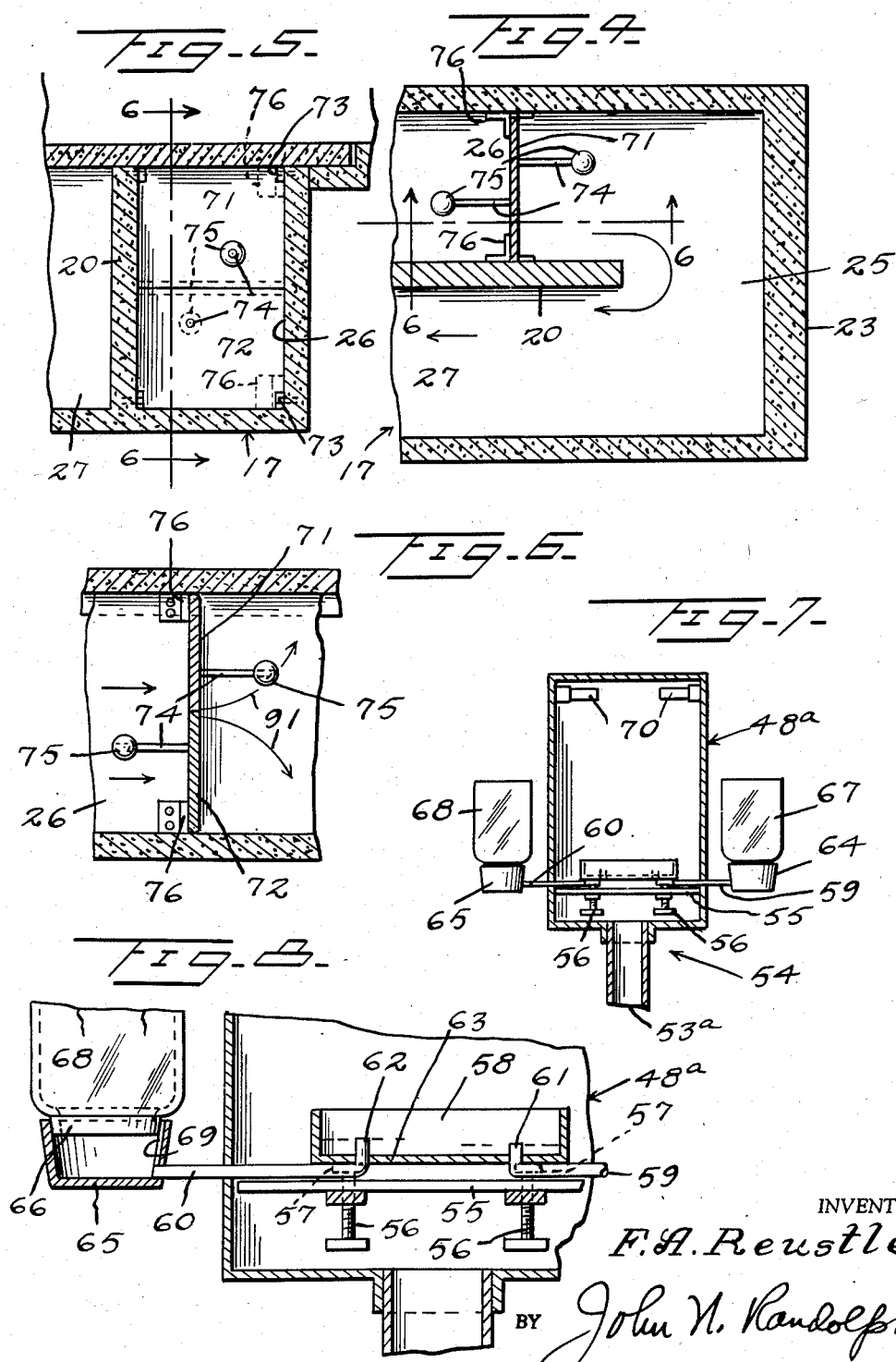
INVENTOR
F. A. Reustle
BY John N. Randolph
ATTORNEY United States Patent Office 2,826,170
Patented Mar. 11, 1958

2,826,170

CHICKEN BROODING AND RAISING APPARATUS

Frank A. Reustle, Norma, N. J.

Application August 1, 1955, Serial No. 525,574

2 Claims. (Cl. 119—34)

This invention relates to a novel apparatus for use in the rearing of chickens and newly hatched chicks to a fully grown size ready to be sold, and has for its primary object to provide an apparatus adapted to be employed in conjunction with a conventional type chicken house to obtain and maintain most desirable and sanitary conditions to insure the raising of the chickens with a minimum of loss.

Another object of the invention is to provide an apparatus capable of being adjusted to initially simulate conditions under which chicks are reared by a brood hen and which conditions may thereafter be varied to best suit older chickens, as the chicks grow and increase in size.

Another object of the invention is to provide an apparatus which will maintain a predetermined most desirable ambient temperature and humidity within the enclosure of the chicken house and which will supply pure breathing air to the chicks and chickens.

Still another object of the invention is to provide an apparatus for use with a conventional chicken house or enclosure which will substantially eliminate the possibility of loss of chickens due to contagious diseases and which will also substantially eliminate the possibility of losing large numbers of chickens during abnormally hot weather, as frequently occurs.

Various other objects and advantages of the invention will hereinafter become more fully apparent from the following description of the drawings, illustrating a presently preferred embodiment thereof, and wherein:

Figure 1 is a fragmentary longitudinal sectional view of a conventional type chicken house or enclosure equipped with the brooding and raising apparatus;

Figure 2 is an enlarged cross sectional view thereof, taken substantially along a plane as indicated by the line 2—2 of Figure 1;

Figure 3 is an enlarged fragmentary cross sectional view, taken substantially along a plane as indicated by the line 3—3 of Figure 1;

Figure 4 is an enlarged fragmentary horizontal sectional view, taken substantially along a plane as indicated by the line 4—4 of Figure 1;

Figure 5 is an enlarged fragmentary transverse sectional view, taken substantially along a plane as indicated by the line 5—5 of Figure 1;

Figure 6 is a fragmentary longitudinal sectional view, taken substantially along a plane as indicated by the lines 6—6 of Figures 4 and 5;

Figure 7 is an enlarged fragmentary vertical sectional view, taken substantially along a plane as indicated by the line 7—7 of Figure 1;

Figure 8 is a fragmentary vertical sectional view taken substantially along the same plane as Figure 7 and on an enlarged scale to illustrate details;

Figure 9 is an enlarged fragmentary horizontal sectional view, taken substantially along a plane as indicated by the line 9—9 of Figure 1;

Figure 10 is a vertical sectional view, taken substantially along a plane as indicated by the line 10—10 of Figure 9;

Figure 11 is an enlarged fragmentary vertical sectional view, taken substantially along a plane as indicated by the line 11—11 of Figure 2, and Figure 12 is a fragmentary front elevational view of a part of the apparatus, taken substantially along a plane as indicated by the line 12—12 of Figure 1.

Referring more specifically to the drawings, the reference numeral 15 designates generally an elongated chicken house or enclosure. The chicken house or enclosure may be of any conventional construction and in most instances is between two and three hundred feet in length. The chicken house or enclosure 15 may include suitable doors and windows, not shown, as is conventional, but which are normally maintained closed and sealed, for a purpose which will hereinafter become apparent.

The apparatus, designated generally 16 and comprising the invention, is adapted for use in conjunction with conventional chicken houses or enclosures and will vary in size, depending upon the size of the enclosure 15 to be serviced thereby. The apparatus 16 includes a trench, designated generally 17, which extends from end-to-end of the enclosure 15 and which opens through the floor 18 of said enclosure, which floor is normally formed of concrete. The member constituting the trench 17 may be composed of any suitable material. Said trench 17 has a substantial part thereof disposed below ground level, as illustrated in Figure 1, wherein the ground level is indicated by the broken line 19. The trench 17 is provided with a longitudinally extending partition 20 which extends from the end of the trench 17 located beneath the end wall 21 of the enclosure 15 to adjacent the other end of the trench 17, which is located beneath the end wall 22. Said last mentioned end of the trench 17 is closed by an end wall 23 thereof which, as seen in Figure 4, is spaced from the adjacent end of the partition 20 to provide a connecting passage 25 between the two longitudinally extending ducts 26 and 27 of the trench 17 and which are formed by the partition 20 and each of which extends from end-to-end of said trench. The open top of the trench 17 is closed by a cover 28 which extends from end-to-end thereof and which seals off the ducts 26 and 27 from the interior of the enclosure 15. Said cover 28 may be formed of sections and may include small removable sections 29 affording access to different portions of the ducts 26 and 27.

A pit 30 of substantially greater depth than the trench 17 is disposed beyond the enclosure end 21. The pit 30 may be formed of any suitable material and extends to slightly above ground level 19. The pit 30 has an inner part 31 which terminates below the level of the remainder of said pit and slightly above the level of the bottom 32 of the trench 17. Accordingly, the upper portion of the pit part 31 closes the bottom portions of the ducts 26 and 27 at the open ends thereof and which abut against said pit part 31. The pit 30, as best illustrated in Figure 3, contains a suitable automatic furnace 33 which is disposed substantially in longitudinal alignment with but below the level of the duct 26, and a conventional blower unit 34 which is disposed substantially in alignment with the duct 27 and which is connected in a conventional manner to the furnace 33. Said furnace 33 may be either an oil burner or gas type conventional automatic furnace capable of being automatically controlled by a thermostat, such as is conventionally employed for heating dwellings and other buildings. An elbow shaped plenum duct 35 provides a connection between the top of the furnace 33 and the restricted open end of the duct 26. A similar plenum duct 36 forms a connecting passage between the top of the blower 34 and the restricted open end of the duct 27, as best illustrated in Figure 1. The ducts 35 and 36 close the open ends of the trench ducts 26 and 27 except for their connection with the furnace and blower, respectively. The open top of the pit 30 may be closed by any suitable cover, not shown, which is removable to afford access to the furnace and blower.

A plurality of tubular outlets 37 are provided, each of which is T-shaped. The longer leg 38 of each outlet member 37 extends through and is supported in the trench cover 28 and has a lower end opening into the duct 26. The upper end of each tube part 38 opens into the intermediate portion of the other horizontal tube part 39, as best illustrated in Figure 11. Said horizontal tube part 39 is supported by the upright tubular member 38 above the cover 28 and has open ends which are preferably restricted by baffle or deflector elements 40 so that air emitted therefrom is deflected upwardly. The upright portion 38 is also provided with a conventional damper 41, located above the trench cover 28. The tubular outlets 37 are arranged in spaced apart relation to one another throughout the length of the enclosure 15.

An elongated hover 42, of a length substantially greater than the length of the outlet part 39, is disposed over each of the outlets 37 and longitudinally of the enclosure 15. Each hover 42 includes a top wall, side walls and end walls and is provided with an open bottom 43. Each hover 42 is suitably suspended from above as by means of a pair of flexible members, such as the chains 44 which are attached to and suspended from the roof 45 of the enclosure 15 and which have lower portions which are adjustably connected to hooks 46 which are fixed to and rise from the hover 42. The hovers 42 are initially suspended by the flexible members 44 so that the open bottoms 43 thereof are spaced slightly above the level of the floor 18 and cover 28 and substantially below the level of the upper tubular outlet parts 39, when the enclosure 15 contains young chicks. As the chicks increase in age and size, the hovers 42 can be gradually raised. After the chicks are five or six weeks old the hovers need no longer be used and may be supported by the flexible means 44 beneath and adjacent the roof 45.

The apparatus 16 includes a plurality, preferably two corresponding air filtering units, each designated generally 47, one of which is illustrated. Each filtering unit 47 includes a hollow box-like casing 48 one wall of which is defined by an air filter 49, as best illustrated in Figure 10, preferably formed of spun glass or the like of approximately two inch thickness, mounted in a frame 50. Another wall of the casing 48 is preferably provided with a transparent portion or window 51 through which the interior of the casing can be viewed. The casing 48 is provided with a flanged opening 52 in the bottom wall thereof in which the upper end of a tubular supporting standard 53 is secured. The lower end of the standard 53 extends through and is secured in the trench cover 28 and opens into the duct 27.

The apparatus 16 also includes a plurality, preferably two air filter units, each designated generally 54. The units 54 include all of the structure previously described of the units 47, and the tubular standards 53a thereof are likewise supported by the cover 28 and open into the duct 27. Additionally, as best illustrated in Figures 7 and 8, a supporting frame 55 is disposed in the casing 48a of each unit 54, above and adjacent the bottom thereof. The supporting frame structure 55 is secured to certain of the vertical walls of the casing 48a not including the wall formed by the filter of said casing. Screws extend upwardly through and are threadedly mounted in the frame structure 55, as indicated at 56, and have upper ends swively connected to socket members 57 which are secured to and disposed on the underside of the bottom of a relatively shallow pan 58. Two pipes 59 and 60 extend through parallel walls of the casing 48a and have upturned inner ends 61 and 62, respectively, which extend upwardly through the pan bottom 63, which is provided with a liquid tight connection around said pipe ends 61 and 62. The outer ends of the pipes 59 and 60 extend into the bottom portions of upwardly opening corresponding cup shaped receptacles 64 and 65, respectively. The annular walls of the receptacles 64 and 65 are downwardly tapered to receive externally tapered necks 66 of jars or similar containers 67 and 68 which are supported in inverted positions on the receptacles 64 and 65, respectively. The necks 66 open into said receptacles substantially above the connection of the pipes 59 and 60 thereto. Each receptacle 64 and 65 has an internal groove 69 which opens through a portion of the upper edge of said wall and which opens into the receptacle below the level of the container neck 66 for venting the receptacle to the atmosphere when a container is supported thereon. The pipes or tubes 59 and 60 are formed of metal but possess sufficient resiliency so that the inner portions thereof may flex when the screws 56 are turned for raising or lowering the pan 58. The pan 58 is thus vertically adjusted so that the open discharge end 62 of the tube 60 will be disposed only slightly below the level of the open bottom of the neck 66 of the jar 68. The upwardly opening discharge end 61 of the tube 59 is disposed slightly below the level of the upper tube end 62, as seen in Figure 8 and likewise slightly below the level of the open end of the neck 66 of the jars 67. Accordingly, the liquid contents of the jars 67 and 68 will be dispensed in a known manner into the pan 58 to normally maintain the liquid level within the pan 58 slightly above the level of the upper end of the tube portion 62. The difference in the level of the upper ends of the tube portions 61 and 62 is such that a greater amount of liquid will be supplied to the pan from the container 68 than from the container 67. Said containers supply a liquid disinfectant to the pan 58 which is picked up by the purified air passing through the casing 48a to the tubular standard 53a. The container 68 preferably contains a solution of formaldehyde or commercial formalin and the container 67 preferably contains a relatively weak solution of aqueous ammonia. The air thus passing through the casing 48a will be disinfected so as to destroy and prevent the growth of bacteria. The disinfectant solution in the pans 58 also acts to neutralize offensive odors inherent in enclosures used for raising chickens. The solution is not of sufficient strength to cause respiratory inflammation in the fowl. The filtering units 47 and 54 are arranged in longitudinally spaced apart relation to one another within the enclosure 15. Additionally, the casings 48 and 48a are each preferably equipped with conventional germicidal lamsp or tubes 70, as illustrated in Figure 7, for sterilizing the air which is withdrawn from the interior of the enclosure 15 and discharged into the duct 27.

As best illustrated in Figures 4, 5 and 6, the trench duct 26, which constitutes the supply duct, is provided adjacent the passage 25 with closure means including an upper closure member 71 and a lower closure member 72. The closures 71 and 72 are hinged at their upper and lower edges, respectively, to the side walls of the duct 26 by hinge means 73 which are anchored to said duct walls and which are journaled in portions of the closures, as best seen in Figure 5. An arm 74 is fixed to and extends outwardly from each of said closures. Said arms 74 project from opposite sides of the closures 71 and 72 and have weights 75 fixed to outer ends thereof and which urge the closures 71 and 72 to swing in directions away from the passage 25 and into engagement with stops 76, which function in combination with the weights 75 to normally maintain the closures 71 and 72 in closed positions, as illustrated in Figures 4, 5 and 6.

The bottom 32 of the trench is preferably provided with spaced wall members 77 within the return conduit 27 which combine with a portion of said bottom 32 and portions of the side walls of the duct 27 to form a relatively shallow basin 78 which may be of any desired length. A supply pipe 79 has a discharge end 80 extending upwardly through the bottom 32 into the basin 78 and terminating below the level of the open top of the basin 78. A float valve unit is associated with the upper discharge end 80 of the supply pipe 79 and includes a lever 81 which is pivotally mounted intermediate of its ends on an arm 82 which projects laterally from the pipe portion 80, within the basin 78. A valve 83 for closing the open upper end of the pipe portion 80 is mounted on one end of the lever 81 and a float 84 is mounted on the other end thereof. When the float drops due to a fall of the liquid level in the basin 78, the lever 81 will rock clockwise as seen in Figure 10 to elevate the valve 83 to an open position, so that water will be supplied to the basin 78 from the discharge end 80 of the water supply pipe 79. The supply duct 26 is provided with a basin 92, as seen in Figure 2, similar to the basin 78 but which is preferably formed by a single partition wall 85 and a part of the pit wall 31 which aligns with the duct 26. A supply pipe 86 has an upturned discharge end 87 discharging into the basin 92, the outlet of which is controlled by a float valve means 88, corresponding to the float valve unit of the basin 78. The supply conduits 79 and 86 lead from a suitable source of water supply and are equipped with manual shutoff means, not shown.

A conventional thermostat 89 is mounted in a suitable location within the enclosure 15 for controlling the operation of the furnace 33. A hygrometer 90 of any suitable type is mounted in a desired location within the enclosure 15 for indicating the humidity within said enclosure.

The blower 34 is operated continuously to maintain air pressure in the supply duct 26 and the plenum duct 35 leading thereto. The closure members 71 and 72 being urged to a closed position by the weights 75 maintain a substantially uniform pressure throughout the supply duct 26, between said closure members and the plenum duct 35. Thus, substantially the same amount of air will be discharged from each of the tubular outlets 37 into the enclosure 15. However, the individual dampers 41 of the outlets 37 may be selectively adjusted to obtain a uniform discharge of air from said outlets or any variation desired in the amount of air discharged. When the apparatus 16 is used under cold weather conditions, the furnace 33 controlled by the thermostat 89 will operate intermittently, as is conventional in connection with automatic furnaces, for maintaining a desired temperature within the enclosure 15. The pressure of the air within the duct 26 augmented by the suction created in the return duct 27 by the blower 34 will cause the closures 71 and 72 to swing toward open positions, as indicated by the arrows 91 in Figure 6 to allow some passage of air through the supply duct 26 between said closures 71 nad 72 under normal conditions. Additionally, the suction in the return duct 27 will produce a suction or partial vacuum in the air filtering units 47 and 54 so that air will be drawn inwardly therethrough from the enclosure 15 and into the return duct 27. The air thus evacuated from the enclosure 15 will be purified in passing through the filter walls 49 and 49a, respectively, of said units and will thereafter be sterilized by the germicidal lamps or tubes 70. Additionally, the air entering the casings 48a of the units 54 will be disinfected by the liquid disinfectant solution within the pans 58 of said units 54 so that purified, sterilized and disinfected air will be constantly supplied through the outlets 37 to the enclosure 15. The air within the enclosure 15 will be replaced in the aforedescribed manner approximately every eight or ten minutes. Accordingly, since the interior of the enclosure 15 is sealed from the atmosphere and is constantly being supplied with sterilized air of a proper temperature, it will be readily apparent that the chicks or chickens being raised in the enclosure will be protected from the various contagious diseases to which fowl are subject and which frequently results in the loss of a large percentage of the fowl being raised within a large enclosure.

Additionally, a supply of water may be automatically maintained within the basin 78 for moistening the air in its passage through the system for maintaining a desired humidity within the enclosure 15. It will be apparent that where this is not required the supply pipe 79 may be shut off manually, in a conventional manner.

When the apparatus or system 16 is utilized under summer or hot weather conditions, it will be readily understood that the furnace will not be operated to heat the air. Rather, the apparatus or system 16, under such circumstances, will function to supply cool sterilized air to the interior of the enclosure 15 and will thus function as a cooling system rather than as a heating system, as previously described. Under extreme hot weather conditions of the type that frequently occurs periodically during the summer in most chicken raising areas of the United States, the mortality rate of chickens being raised in enclosures such as the enclosure 15 is extremely high. However, by supplying water to the basins 78 and 92, the purified air discharged from the outlets 37 into the enclosure 15 will be maintained sufficiently cool to keep the temperature within the enclosure 15 at a proper temperature for the raising of chicks or chickens even when the temperature outside of the enclosure is extremely high, since the basins 78 and 92 are disposed below ground level so that water may be maintained therein at a low temperature.

Various modifications and changes are contemplated and may obviously be resorted to, without departing from the spirit or scope of the invention as hereinafter defined by the appended claims.

I claim as my invention:

1. An air conditioning system comprising in combination with an elongated enclosure sealed from the atmosphere for use in the raising of fowl, a duct system including a supply duct and a return duct each extending substantially from end-to-end of the enclosure and constituting the sole means for supplying air to and exhausing air from said enclosure, blower means connected to corresponding ends of said ducts for drawing air from the return duct and for supplying air under pressure to the supply duct, a plurality of outlets connected to the supply duct for discharging air therefrom into the enclosure, a plurality of inlets communicating with the enclosure and connected to the return duct through which air is extracted by suction from the enclosure and discharged into said return duct, said ducts comprising portions of a trench disposed beneath and longitudinally of the enclosure and having a substantial part extending from end-to-end thereof disposed below ground level, a partition disposed longitudinally in the trench and separating the ducts, said trench having a passage connecting the ducts at the ends thereof disposed remote from the blower means, pressure responsive closure means disposed in the supply duct adjacent said passage opened by the pressure of the air in the supply duct for maintaining a predetermined air pressure within the supply duct so that a substantially uniform amount of air will be supplied to the enclosure from each of the outlets and whereby a portion of the air passing through the supply duct will pass said closure means and return to the return duct, hood shaped hovers having open bottoms loosely disposed over said air outlets, means for adjustably supporting each of the hovers with the open bottom thereof in an elevated position relative to the enclosure floor said air inlets communicating with the enclosure adjacent the top thereof and said air outlets discharging into the enclosure adjacent the enclosure floor, an air filtering unit supported by the inlet end of each air inlet, each air filtering unit including a relatively thick filter member through which the air is drawn from the enclosure, germicidal tubes contained in certain of said filtering units for sterilizing the air, and liquid disinfecting means disposed in certain of said filtering units for disinfecting the air passing therethrough.

2. An air conditioning system comprising in combination with an elongated enclosure sealed from the atmosphere for use in raising of fowl, a duct system including a supply duct and a return duct each extending substantially from end-to-end of the enclosure and constituting the sole means for supplying air to and exhausing air from said enclosure, blower means connected to corresponding ends of said ducts for drawing air from the return duct and for supplying air under pressure to the supply duct, a plurality of outlets connected to the supply duct for discharging air therefrom into the enclosure, a plurality of inlets communicating with the enclosure and connected to the return duct through which air is extracted by suction from the enclosure and discharged into said return duct, said duct comprising portions of a trench disposed beneath and longitudinally of the enclosure and having a substantial part extending from end-to-end thereof disposed below ground level, a partition disposed longitudinally in the trench and separating the ducts, said trench having a passage connecting the ducts at the ends thereof disposed remote from the blower means, pressure responsive closure means disposed in the supply duct adjacent said passage opened by the pressure of the air in the supply duct for maintaining a predetermined air pressure within the supply duct so that a substantially uniform amount of air will be supplied to the enclosure from each of the outlets and whereby a portion of the air passing through the supply duct will pass said closure means and return to the return duct, hood shaped hovers having open bottoms loosely disposed over said air outlets, means for adjustably supporting each of the hovers with the open bottom thereof in an elevated position relative to the enclosure floor, a basin formed in the bottom portion of a part of the trench, and automatically controlled means for maintaining a supply of water in said basin for humidifying the air passing through the trench.

References Cited in the file of this patent

UNITED STATES PATENTS

| | | |
|---|---|---|
| 1,265,552 | Tripp | May 7, 1918 |
| 1,658,690 | Sanctuary et al. | Feb. 7, 1928 |
| 1,859,613 | Bailey | May 24, 1932 |
| 1,977,315 | Lewis | Oct. 16, 1934 |
| 2,047,844 | Wehner | July 14, 1936 |
| 2,564,215 | Slane | Aug. 14, 1951 |
| 2,609,183 | Fitzgerald | Sept. 2, 1952 |
| 2,675,998 | Reynolds | Apr. 20, 1954 |

FOREIGN PATENTS

| | | |
|---|---|---|
| 367,002 | Great Britain | Feb. 4, 1932 |
| 450,340 | Great Britain | July 15, 1936 |
| 514,673 | Germany | Dec. 15, 1930 |